(No Model.) 3 Sheets—Sheet 3.
N. E. BROWN.
VENEER CUTTING MACHINE.
No. 528,120. Patented Oct. 23, 1894.
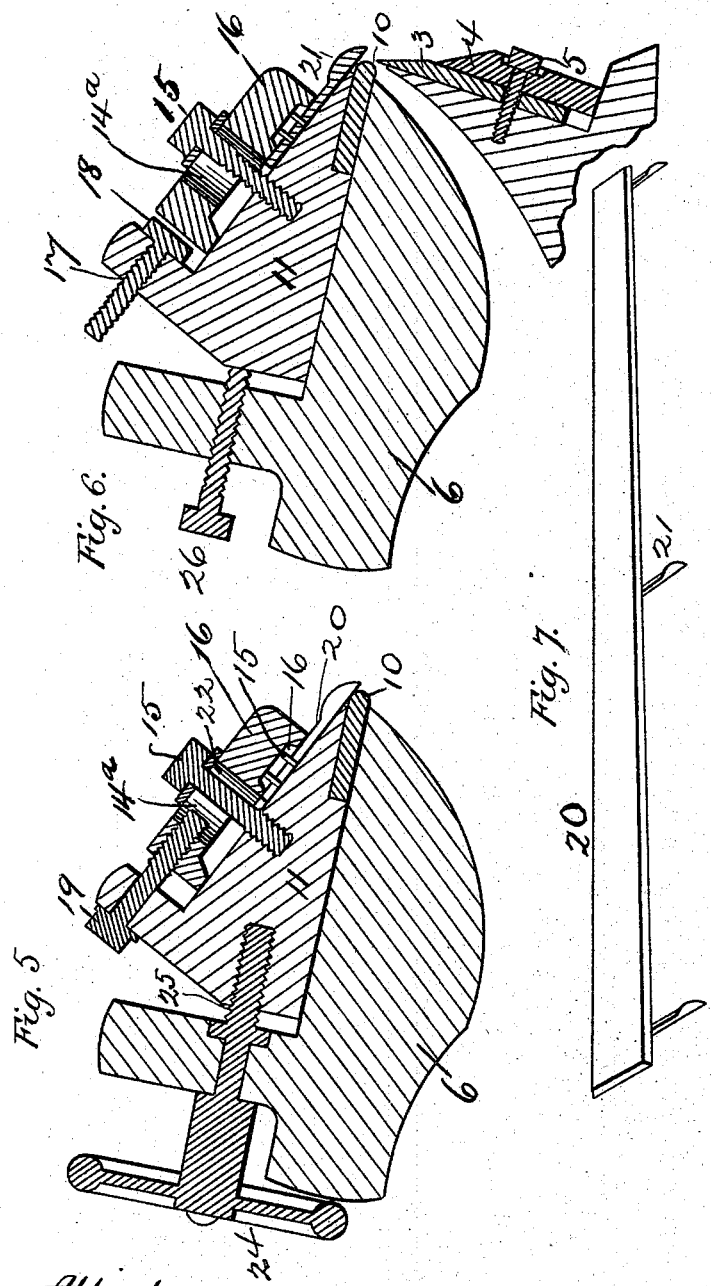
Attest:
Inventor:
Norman E. Brown
By Chas J. Gooch
attorney.

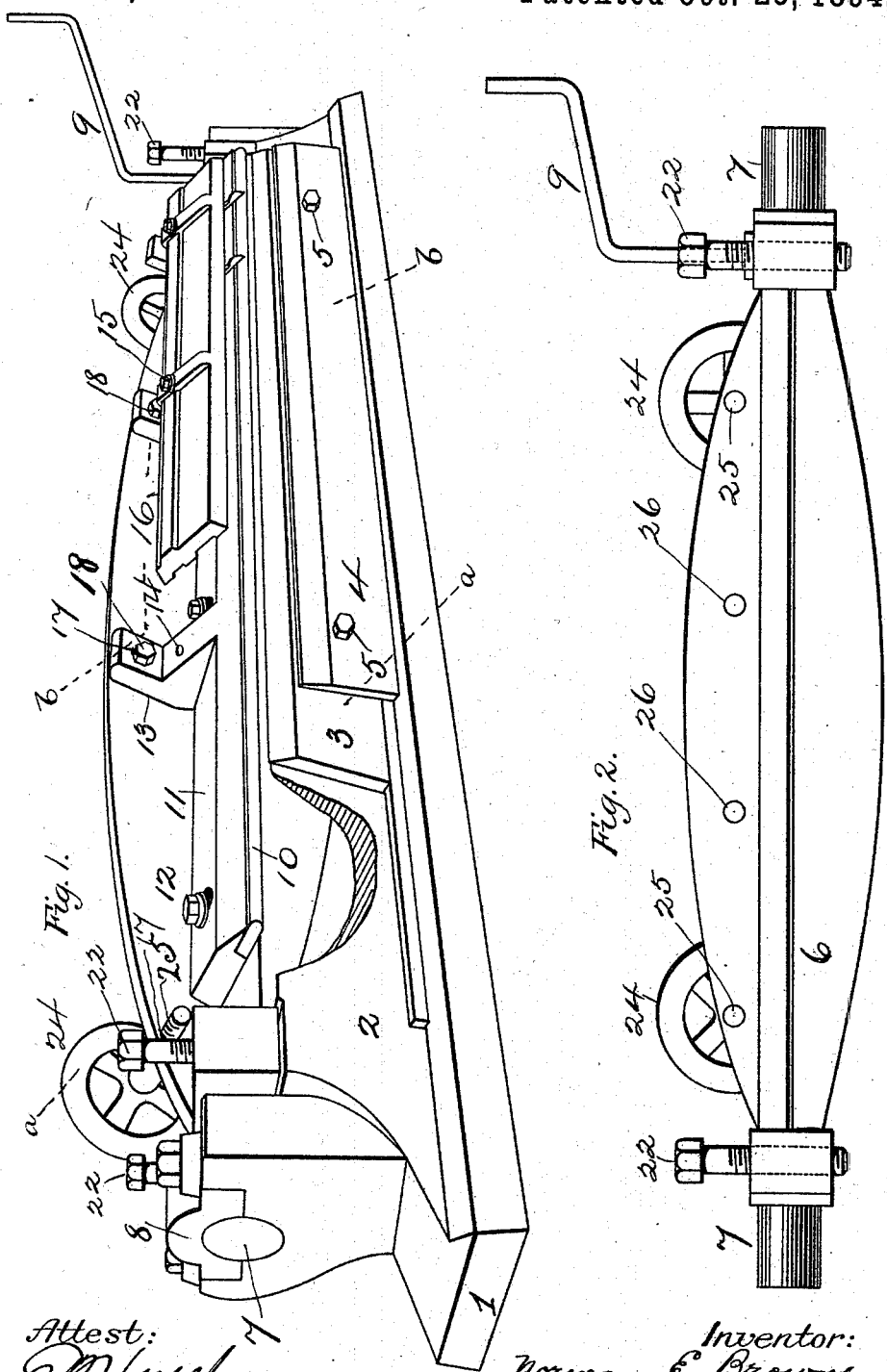

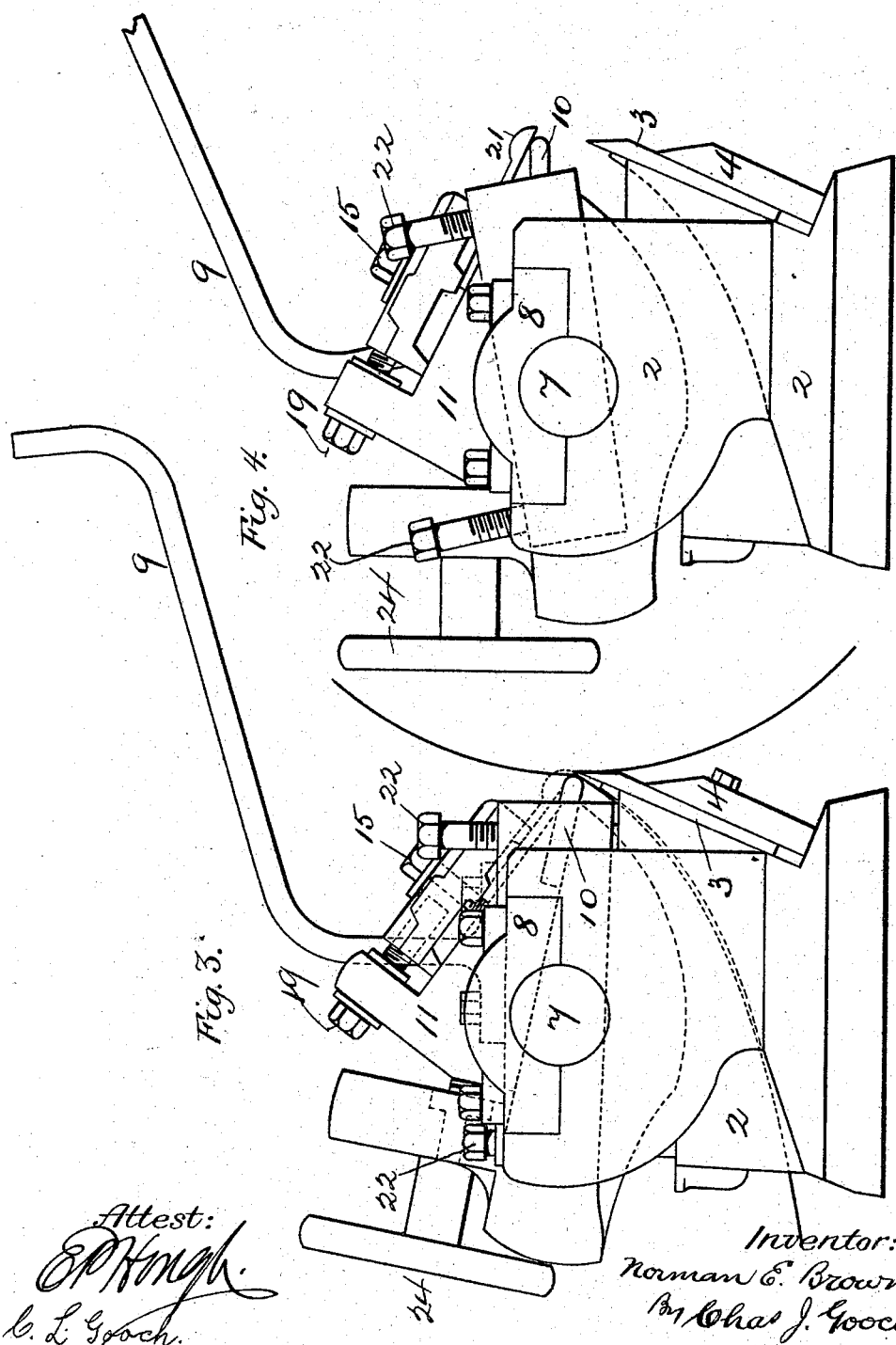

UNITED STATES PATENT OFFICE.

NORMAN E. BROWN, OF ST. JOSEPH, MICHIGAN, ASSIGNOR OF THREE-FOURTHS TO MERWIN C. BARNES, EDWARD N. HATCH, JOHN E. KLUND, AND JOHN LINDT, OF SAME PLACE.

VENEER-CUTTING MACHINE.

SPECIFICATION forming part of Letters Patent No. 528,120, dated October 23, 1894.

Application filed March 10, 1894. Serial No. 503,187. (No model.)

*To all whom it may concern:*

Be it known that I, NORMAN E. BROWN, a citizen of the United States, residing at St. Joseph, in the county of Berrien and State of Michigan, have invented certain new and useful Improvements in Veneer-Cutting Machines; and I do hereby declare the following to be a full, clear, and exact description of the invention, such as will enable others skilled in the art to which it appertains to make and use the same.

This invention relates to improvements, as hereinafter set forth, in veneer-cutting machines.

In the accompanying drawings, Figure 1, represents a perspective, partly broken away, of so much of a veneer cutting machine as is necessary to show, with my improvements applied thereto. Fig. 2 represents a front elevation of the trunnioned carrier or supporter. Fig. 3 represents an end elevation of the machine in use, the dotted lines indicating the tilting capacity of the supporter and parts carried thereby. Fig. 4 represents an end view of the machine with the carrier tilted back. Fig. 5 represents a section taken on the line, $a, a$, of Fig. 1. Fig. 6 represents a section taken on the line, $b, b$, of Fig. 1. Fig. 7 represents a detail view of the spur-bar.

The main object of my present improvements is to produce a lathe or machine for cutting veneers in which the spur-bar and presser-bar can be conveniently and readily adjusted and maintained in position as desired and the presser-bar rockingly supported and adjusted in position relatively to the knife and material being operated upon.

1 represents the framing; 2, the knife-bar; 3, the knife; 4, the knife-clamping bar, and, 5, the bolts connecting the knife, knife-bar and knife-clamping bar.

6 represents the presser-bar supporter or carrier. This is mounted on trunnions or journals 7, which have rocking bearing in the ends of the framing as shown, boxes, 8, serving to hold said trunnions in place.

9 represents a lever attached to one end of the presser bar supporter, 6, by means of which said supporter may be rocked on the trunnions, 7, so as to tilt it and the presser-bar either forwardly or rearwardly as desired.

10 represents the presser-bar which is carried by the clamp-bar, 11, said bar, 11, having at suitable distances apart vertical elongated holes through which are passed holding-down bolts, 12, whereby said bar is adjustably held to the supporter, 6, rearwardly and upwardly-extending arms or lugs, 13, being formed on said presser-bar clamp-bar, 11, and having vertical elongated holes, 14, through which, and through other elongated holes, $14^a$, in the spur clamp bar, 16, are passed holding-down bolts or screws, 15, whereby the spur-bar clamp, 16, is clamped to said presser-bar clamp, 11, with capability of transverse adjustment thereon, and horizontal holes, 17, through which are passed, respectively, screws, 18, for centrally supporting the spur-bar clamp, 16, and set screws, 19, which engage with and by turning which screws, 19, the bar, 16, may be adjusted upon the presser-bar clamp, as shown in Fig. 5. The spur-bar, 20, having the usual spurs, 21, fits within the grooved under face of the spur-bar clamp, 16, which latter has a series of elongated slots, $14^a$, through which are passed the holding-down screws or bolts, 15, by which said clamp-bar, 16, is attached to the presser bar carrier or clamp, 11, the elongated character of said slots, $14^a$, admitting of the ready horizontal adjustment of said spur-bar clamp and spur-bar as may be required.

24 represents hand wheels at each end of the machine, each provided with an inwardly-extending pressure screw, 25, which engages with the presser-bar carrier, 11, the object of said hand-wheels being, as they are turned in either direction, to adjust the presser-bar carrier, or clamp, and its attachments, either forwardly or rearwardly and hold the same in either adjusted position. The presser-bar carrier, 6, is held in its adjusted positions by vertical set-screws, 22.

26 represents set-screws which are passed through the rear of the framing, 1, into engagement with the presser-bar clamp-bar, 11, for the purpose of affording central support thereto.

The operation and advantages of this machine will be readily apparent to those skilled in this art. The presser-bar clamp, and of course the presser-bar, can be horizontally adjusted independently of the horizontal adjustment of the spur-clamp and spur-bar, and said parts maintained in their position of adjustment at all times. By means of the trunnions the carrier, 6, can be rocked or tilted back and forth for convenience in clearing slivers and other obstacles from between the presser-bar and the knife without stopping the machine, the knife can be readily sharpened, and the same adjusted distance is constantly maintained between the knife, presser-bar and spur-bar, so that no adjustment of the parts is necessary after clearing away the slivers or other matters, or after sharpening the knife to bring the presser-bar to the same pressure on the log. The spurs operate as trimmers to trim the edges of the veneer. By the adjustments and tilting support afforded the presser-bar carrier much time is saved in the operation of the machine.

What I claim is—

1. In a veneer-cutting machine, a presser-bar clamp, a presser-bar secured thereto, a supporter or carrier having trunnions or ends journaled in the framing, adjusting screws adapted to horizontally adjust said presser-bar clamp and means, as set screws or screw bolts adapted to secure said presser-bar clamp to its supporter and lock said supporter in its adjusted positions, substantially as and for the purpose set forth.

2. In a veneer-cutting machine, a framing, a knife bar, knife and knife-clamp, a presser-bar and presser-bar clamp supporter or carrier rockingly journaled in the framing a lever adapted to rock said supporter or carrier on its journals, hand-wheels and set screws adapted to transversely or horizontally adjust said presser-bar clamp and means, as screws or bolts, for connecting said presser-bar clamp and supporter and securing said supporter in its adjusted positions, substantially as and for the purpose set forth.

3. In a veneer-cutting machine, a framing, a knife and knife-clamp secured thereto, a presser-bar supporter rockingly journaled at its respective ends in said framing, a lever adapted to rock said supporter on its journals, set screws adapted to secure said supporter in its adjusted positions, a presser-bar clamp carrying a presser-bar and having vertically and horizontally-slotted lugs or arms, set screws for horizontally adjusting and supporting said presser-bar clamp, a spur-bar, a spur-bar clamp having grooved under face to receive said spur-bar and clamp, screws or bolts extending vertically through said spur-bar clamp and engaging the vertical slots in the lugs in the presser-bar clamp for the purpose of connecting said spur-bar clamp and presser-bar clamp, substantially as and for the purpose set forth.

In testimony whereof I affix my signature in presence of two witnesses.

NORMAN E. BROWN.

Witnesses:
LAWRENCE C. FYFE,
THOS. E. JONES.